US008625606B2

(12) United States Patent
Drevö

(10) Patent No.: US 8,625,606 B2
(45) Date of Patent: Jan. 7, 2014

(54) SERVICE CONTINUITY WITHIN A MBSFN SERVICE AREA OF A WIRELESS TELECOMMUNICATION SYSTEM

(75) Inventor: Markus Drevö, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 180 days.

(21) Appl. No.: 13/217,542

(22) Filed: Aug. 25, 2011

(65) Prior Publication Data

US 2013/0051298 A1    Feb. 28, 2013

(30) Foreign Application Priority Data

Aug. 24, 2011  (SE) ................................. 2011/051018

(51) Int. Cl.
*H04L 12/56* (2011.01)
(52) U.S. Cl.
USPC ...... 370/395.43; 370/230; 370/234; 370/312; 370/328; 370/338
(58) Field of Classification Search
USPC .......................... 370/230–234, 312, 328–338
See application file for complete search history.

(56) References Cited

U.S. PATENT DOCUMENTS

| 2005/0063339 | A1* | 3/2005 | Jeong et al. | 370/331 |
| 2010/0189027 | A1* | 7/2010 | Ishida et al. | 370/312 |
| 2012/0236776 | A1* | 9/2012 | Zhang et al. | 370/312 |

OTHER PUBLICATIONS

CATT. Clarification on MBMS Service Continuity. 3GPP Draft; R2-111843. 3$^{rd}$ Generation Partnership Project: Sophia Antipolis Cedex, France, Apr. 3, 2011.
3GPP. 3$^{rd}$ Generation Partnership Project; Technical Specification Group Radio Access Network; Evolved Universal Terrestrial Radio Access Network (E-UTRAN); M2 Application Protocol (M2AP) (Release 10). 3GPP TS 36.443 v10.1.0 (Mar. 2011).
3GPP. 3rd Generation Partnership Project; Technical Specification Group Radio Access Network; Evolved Universal Terrestrial Radio Access Network (E-UTRAN); X2 applicaton protocol (X2AP) (Release 10). 3GPP TS 36.423 v10.2.0 (Jun. 2011).
3GPP. 3$^{rd}$ Generation Partnership Project; Technical Specification Group Radio Access Network; Evolved Universal Terrestrial Radio Access Network (E-UTRAN); S1 Application Protocol (S1AP) (Release 10). 3GPP TS 36.413 v10.1.0 (Mar. 2011).
3GPP. 3$^{rd}$ Generation Partnership Project; Technical Specification Group Radio Access Network; Evolved Universal Terrestrial Radio Access (E-UTRA) and Evolved Universal Terrestrial Radio Access Network (U-TRAN); Overall Description; Stage 2 (Release 10). 3GPP TS 36.300 v10.4.0 (Jun. 2011).
Alcatel-Lucent, Neighbouring cells MBSFN area information exchange in M2AP for MBMS service continuity. 3GPP TSG-RAN WG3 Meeting #72. R3-111333. Barcelona, Spain, May 9-13, 2011.

(Continued)

*Primary Examiner* — Kibrom T Hailu
*Assistant Examiner* — Zewdu A Beyen

(57) ABSTRACT

A wireless telecommunication system, an apparatus (e.g., base station, eNB) and a method are described herein for selecting a target cell to handover a user equipment such that the user equipment would continue to receive a Multimedia Broadcast Multicast Service (MBMS) service or would be able to receive a MBMS service they where interested in receiving.

18 Claims, 5 Drawing Sheets

(56) References Cited

OTHER PUBLICATIONS

3GPP. 3rd Generation Partnership Project; Technical Specification Group Services and System Aspects; Multimedia Broadcast/Multicast Service (MBMS); Architecture and functional description (Release 9). 3GPP TS 23.246 V9.5.0 (Jun. 2010).

Alcatel-Lucent: "Neighbouring cell MBMS service information for service continuity". 3GPP TSG-RAN WG2 Meeting #75. R2-114280. Aug. 22-26, 2011. Athens, Greece.

Huawei: "Summary of Email Discussion [74#34]13 LTE: Rel-11 MBMS". 3GPP TSG RAN WG2 #75. R2-114407. Aug. 22-26, 2011. Athens, Greece.

* cited by examiner

SERVICE CONTINUITY WITHIN A MBSFN SERVICE AREA OF A WIRELESS TELECOMMUNICATION SYSTEM

RELATED APPLICATIONS

This application claims the benefit of International Application No. PCT/SE2011/051018, filed Aug. 24, 2011, the disclosure of which is fully incorporated herein by reference.

TECHNICAL FIELD

The present invention relates to a wireless telecommunication system, an apparatus (e.g., base station, eNB) and a method for selecting a target cell to handover a user equipment such that the user equipment would continue to receive a Multimedia Broadcast Multicast Service (MBMS) service.

BACKGROUND

The following abbreviations are herewith defined, at least some of which are referred to within the following description about at least the prior art and/or the present invention.
1x EV-DO 1x Evolved-Data Optimized
CDMA2000 Code Division Multiple Access
3GPP2 Third Generation Partnership Project 2
GSM Global System for Mobile Communications
LTE Long-Term Evolution
MBMS Multimedia Broadcast Multicast Services
MBSFN Multicast Broadcast Single Frequency Network
MCE Multi-Cell/Multicast Coordination Entity
MME Mobile Management Entity
S-GW Serving Gateway
UMTS/W-CDMA Universal Mobile Telecommunications System/Wideband-CDMA
WiMAX Worldwide Interoperability for Microwave Access Referring to FIG. 1 (PRIOR ART), there is a diagram of an exemplary traditional LTE wireless telecommunications network 100 configured to provide a MBMS service to one or more UEs 102 (only one shown). In this example, the traditional LTE wireless telecommunications network 100 includes two MMEs/S-GWs 104a and 104b, four eNBs 106a, 106b, 106c and 106d, four cells 108a, 108b, 108c and 108d, and three MCEs 110a, 110b and 110c. The first MME/S-GW 104a has S1 interfaces with eNBs 106a and 106b. The second MME/S-GW 104b has S1 interfaces with eNBs 106c and 106d. The first MCE 110a has a M2 interface with eNB 106b. The second MCE 110b has M2 interfaces with eNBs 106a and 106d. The third MCE 110c has a M2 interface with eNB 106c. The eNBs 106a, 106b, 106c and 106d communicate with one another over multiple X2 interfaces. The eNBs 106a, 106b, 106c and 106d respectively manage their own cells 108a, 108b, 108c and 108d which have their own radio cover areas within which there may be one or more UEs 102. In this example, the cells 108a, 108b, 108c and 108d have the following cell information:

Cell 108a (Cell 1): MBSFN Synchronization Area=1 and MBSFN Area=1. The UE 102 which is located within cell 108a has a TMGI=1.
Cell 108b (Cell 2): MBSFN Synchronization Area=2 and MBSFN Area=1.
Cell 108c (Cell 3): MBSFN Synchronization Area=1 and MBSFN Area=2.
Cell 108d (Cell 4): MBSFN Synchronization Area=1 and MBSFN Area=1.

The exemplary traditional LTE wireless telecommunications network 100 has an architecture and functionality for providing MBMS to UEs 102 as described in 3GPP TS 36.300 entitled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" dated June 2011. The contents of this document are incorporated by reference herein. The skilled person will appreciate that the exemplary traditional LTE wireless telecommunication system 100 may have many different configurations and may support multiple UEs 102, multiple MMEs/S-GWs 104a and 104b, multiple eNBs 106a, 106b, 106c and 106d, and multiple MCEs 110a, 110b and 110c. In addition, the skilled person will also appreciate that the exemplary traditional LTE wireless telecommunication system 100 would include many other components which are well known in the art but their description is not needed to explain a particular problem that may occur when the UE 102 which is currently receiving a MBMS service moves away from their current source cell 108a (for example). This particular problem is discussed in detail next.

In the exemplary traditional LTE wireless telecommunications system 100 there is a MBMS Service present in a subset of the cells 108a, 108b, 108c and 108d. If the UE 102 is in connected mode and receiving a MBMS service then it would be advantageous to handover the UE 102 to another cell supporting the same MBMS service so the UE 102 continues to receive the MBMS service. If the target cell does not support the same MBMS Service, then the UE 102 may decide to receive this service over unicast which increases the traffic load in the network 100 or the UE 102 may not be able to access the MBMS service at all if for instance the cell does not have the extra resources.

In the present example, when the UE 102 is in cell 108a and a handover is made to cell 108b where the two cells 108a and 108b have the same MBSFN areas IDs but the MBSFN Synchronization areas are different. This means that the two MBSFN areas are not identical but they have been assigned the same MBSFN area by chance or accident. In this case, when the UE 102 is handed over to cell 108b, it is possible that the service is not available over MBSFN hence the UE 102 may not be able to receive the service. If the UE 102 is handover from cell 108a to cell 108c then same problem may occur because the MBSFN areas are different. If the UE 102 is handover from cell 108a to cell 108d it is guaranteed that the target cell 108d supports the service since both cells 108a and 108d support the same MBSFN area and the same MBSFN Synchronization area. Thus, if eNB 104a selects cell 108d as the target cell for the handover then the UE 102 will be able to receive the broadcasted service received in the source cell 108a. However, the eNB 104a currently does not have the information needed to help select a target cell so the UE 102 may continue to receive the MBMS Service. This need and other needs are satisfied by the present invention.

SUMMARY

An apparatus, a method, and a wireless telecommunication system that address the aforementioned shortcoming and other shortcomings of the prior art are described in the independent claims of the present application. Advantageous embodiments of the apparatus, the method, and the wireless telecommunication system have been described in the dependent claims of the present application.

In an aspect of exemplary embodiments of the present invention there is provided an apparatus (e.g. eNB, base station) configured to manage a source cell with a radio coverage area within which there is currently located a UE. The apparatus comprises a processor and a memory that stores processor-executable instructions therein where the processor interfaces with the memory and executes the processor-executable instructions to select a target cell to handover the user equipment such that the user equipment would continue to receive a MBMS service. In one example, the apparatus is able to select the target cell when the processor interfaces with the memory and executes processor-executable instructions stored therein to: (a) request the UE while located within the source cell to provide information about the MBMS service; (b) receive the requested information from the UE; (c) acquire information which identifies a MBSFN Area and optionally a MBSFN Synchronization Area within each of neighboring cells adjacent to the source cell; and (d) select one of the neighboring cells to be the target cell to handover the UE by using the received information from the UE and the acquired information about each of the neighboring cells. The advantage of the apparatus is that the UE after undergoing the handover to the target cell would continue to receive the MBMS service.

In yet another aspect of exemplary embodiments of the present invention there is provided a method implemented by an apparatus (e.g., eNB, base station) which manages a source cell with a radio coverage area in which there is currently located a UE. In one example, the apparatus implements the method to select a target cell to handover the UE such that the UE would continue to receive a MBMS service. At one step, the apparatus requests the UE while located within the source cell to provide information about the MBMS service they are currently receiving. At another step, the apparatus receives the requested information from the UE. At yet another step, the apparatus acquires information which identifies a MBSFN Area and optionally a MBSFN Synchronization Area within each of neighboring cells adjacent to the source cell. At another step, the apparatus selects one of the neighboring cells to be the target cell to handover the UE by using the received information from the UE and the acquired information about each of the neighboring cells. The advantage of the method is that the UE after undergoing the handover to the target cell would continue to receive the MBMS service.

In still yet another aspect of exemplary embodiments of the present invention there is provided a wireless telecommunication system comprising an apparatus (e.g., eNB, bases station) configured to manage a source cell with a radio coverage area within which there is currently located a UE, and at least one neighboring apparatus each of which is configured to manage a neighboring cell which is adjacent to the source cell. The apparatus comprises a processor and a memory that stores processor-executable instructions therein where the processor interfaces with the memory and executes the processor-executable instructions to select a target cell to handover the user equipment such that the user equipment would continue to receive a MBMS service. In one example, the apparatus is able to select the target cell when the processor interfaces with the memory and executes processor-executable instructions stored therein to: (a) request the UE while located within the source cell to provide information about the MBMS service; (b) receive the requested information from the UE; (c) acquire information which identifies a MBSFN Area and optionally a MBSFN Synchronization Area within each of neighboring cells adjacent to the source cell; and (d) select one of the neighboring cells to be the target cell to handover the UE by using the received information from the UE and the acquired information about each of the neighboring cells such that the UE after undergoing the handover to the target cell would continue to receive the MBMS service.

In the event, the apparatus is not able to select a target cell to handover the UE such that the UE would continue to receive the MBMS service then the apparatus sends the received information about the MBMS service currently being received by the UE to the neighboring apparatus that was selected for the handover of the UE even though the neighboring cell associated with the selected neighboring apparatus does not support the MBMS service. Then, the neighboring apparatus would use the received information about the MBMS service that was previously received by the UE during another handover to select another target cell where the UE would be able to receive the MBMS service. Further in the event, the selected neighboring apparatus is not able to select a target cell to handover the UE such that the UE would be able to receive the MBMS service then the selected neighboring apparatus sends the received information about the MBMS service that was previously received by the UE to another apparatus that was selected for the handover of the UE even though a cell associated with the selected another apparatus does not support the MBMS service. Then, the selected another apparatus would use the received information about the MBMS service that was previously received by the UE during yet another handover to select yet another target cell where the UE would be able to receive the MBMS service.

Additional aspects of exemplary embodiments of the present invention will be set forth, in part, in the detailed description, figures and any claims which follow, and in part will be derived from the detailed description. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
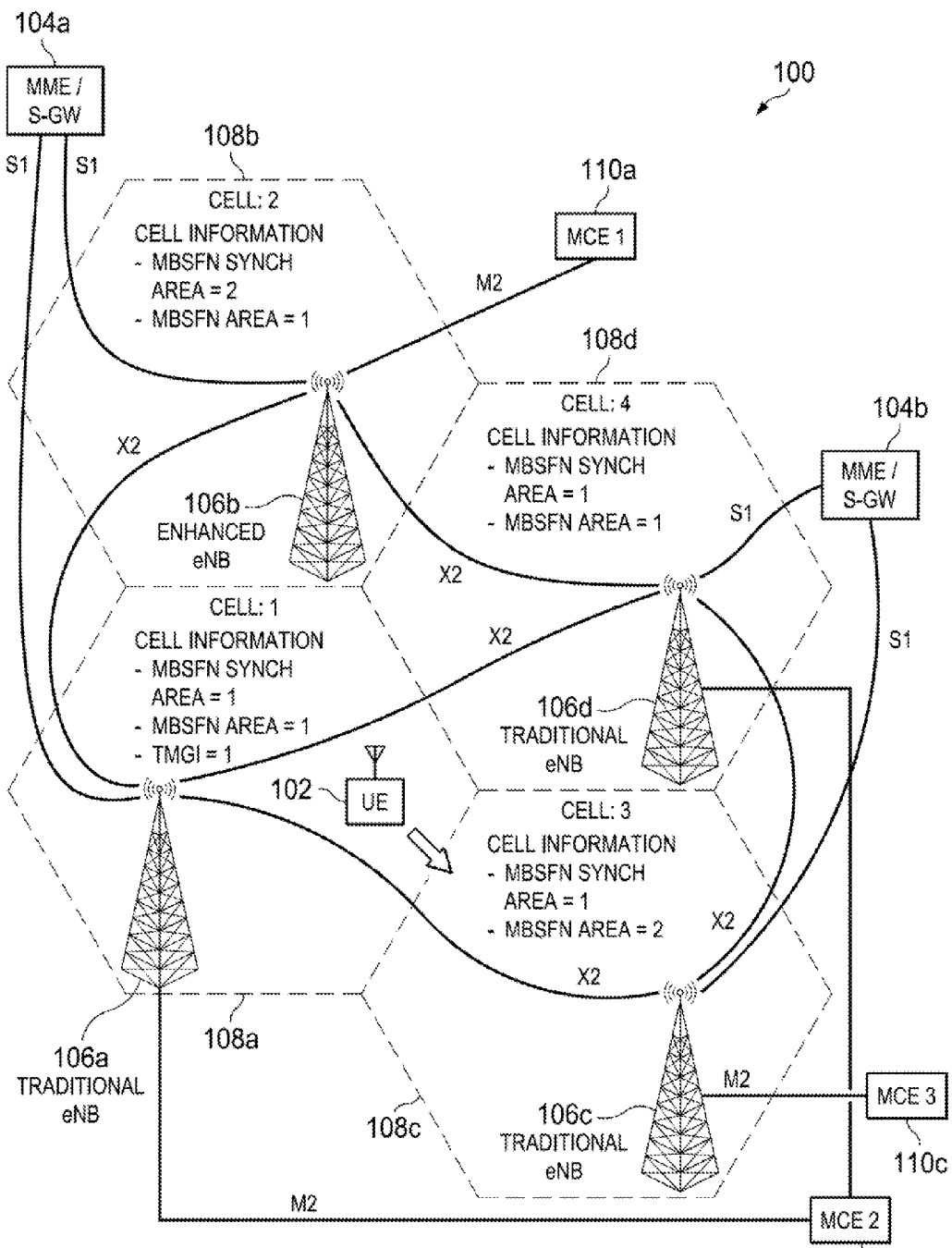
FIG. 1 (PRIOR ART) is a diagram of an exemplary traditional LTE wireless telecommunications network which is used to explain a problem that may occur when an apparatus (e.g., eNB) performs a handover for a UE that is receiving a MBMS service to another apparatus (e.g., eNB)
Figure 2:
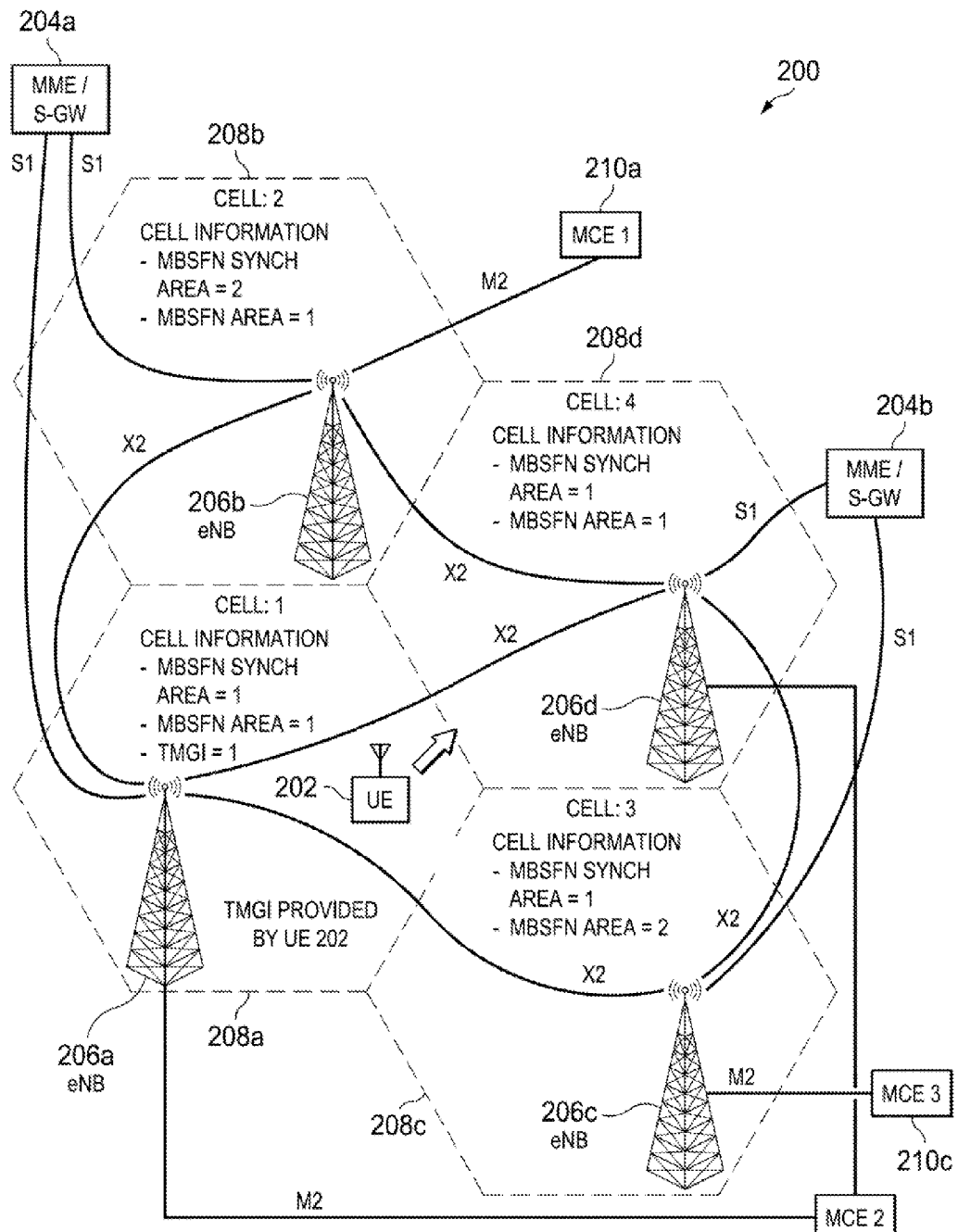
FIG. 2 is a block diagram of an exemplary wireless telecommunication system which has one or more apparatuses (e.g. eNBs) that are configured in accordance with an embodiment of the present invention.

Referring to FIG. 2, there is a diagram of an exemplary LTE wireless telecommunications network 200 configured to provide a MBMS service to one or more UEs 202 (only one shown) in accordance with an embodiment of the present invention. In this example, the exemplary LTE wireless telecommunications network 200 includes two MMEs/S-GWs 204a and 204b, four eNBs 206a, 206b, 206c and 206d, four cells 208a, 208b, 208c and 208d, and three MCEs 210a, 210b and 210c. The first MME/S-GW 204a has S1 interfaces with eNBs 206a and 206b. The second MME/S-GW 204b has S1 interfaces with eNBs 206c and 206d. The first MCE 210a has a M2 interface with eNB 206b. The second MCE 210b has M2 interfaces with eNBs 206a and 206d. The third MCE 210c has a M2 interface with eNB 206c. The eNBs 206a, 206b, 206c and 206d communicate with one another over multiple X2 interfaces. The eNBs 206a, 206b, 206c and 206d respectively manage their own cells 208a, 208b, 208c and 208d which have their own radio cover areas within which there may be one or more UEs 202. In this example, the cells 208a, 208b, 208c and 208d have the following cell information:

Cell 208a (Cell 1): MBSFN Synchronization Area=1 and MBSFN Area=1. The UE 202 which is located within cell 208a has a TMGI=1.

Cell 208b (Cell 2): MBSFN Synchronization Area=2 and MBSFN Area=1.

Cell 208c (Cell 3): MBSFN Synchronization Area=1 and MBSFN Area=2.

Cell 208d (Cell 4): MBSFN Synchronization Area=1 and MBSFN Area=1.

The exemplary LTE wireless telecommunications network 200 has an architecture and functionality for providing MBMS to UEs 202 as described in 3GPP TS 36.300 entitled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" dated June 2011. Note that that the 3GPP TS 36.300 standard does not disclose the eNBs 206a, 206b, 206c and 206d. The exemplary LTE wireless telecommunication system 200 may have many different configurations and may support multiple UEs 202, multiple MMEs/S-GWs 204a and 204b, multiple eNBs 206a, 206b, 206c and 206d, and multiple MCEs 110a, 110b and 110c. In addition, the exemplary LTE wireless telecommunication system 200 would include many other components but for clarity are not described herein while the eNBs 206a, 206b, 206c and 206d are described in detail herein. A detailed description is provided next to explain how one eNB 206a (for example) is configured to select a target cell associated with another eNB 206b, 206c or 206d (or possibly a traditional eNB) to handover the UE 202 such that the UE 202 would continue to receive a MBMS service when moving from the radio coverage area of a source cell to the radio coverage area of a target cell.

Figure 3:
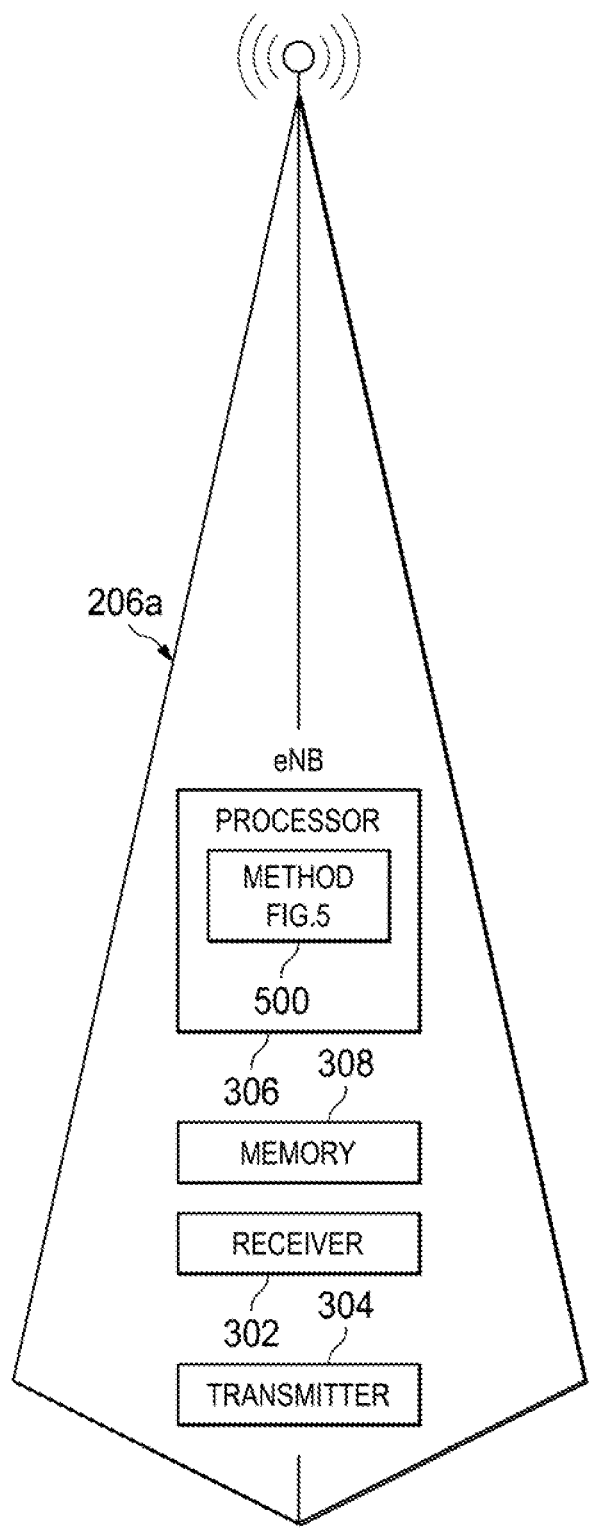
FIG. 3 is a block diagram illustrating in greater detail the apparatus (e.g., eNB) shown in FIG. 2 in accordance with an embodiment of the present invention.

Referring to FIG. 3, there is a block diagram illustrating in greater detail the eNB 206a (for example) configured in accordance with an exemplary embodiment of the present invention. As shown, the eNB 206a includes a receiver 302, a transmitter 304, a processor 306, and a memory 308 (storage medium 308). The receiver 302 is configured to receive signals from the UE 202 (see step 502 in FIG. 5). The transmitter 304 is configured to transmit signals to the UE 202 (see step 504 in FIG. 5). It should be mentioned that eNB 206a has many well known components incorporated therein but for clarity those well known components are not described herein.

In particular, the eNB 206a is configured to manage source cell 208a (cell 1) with a radio coverage area within which there is currently located the UE 202 (see FIG. 2). The UE 202 is currently receiving a MBMS service or is at least interested in receiving a MBMS service. The UE 202 is also currently moving away from the radio coverage area within the source cell 208a. The eNB 206 is further configured such that the processor 306 interfaces with the memory 308 and executes processor-executable instructions stored therein to select a target cell 208d (for example) to handover the UE 202 such that the UE 202 would continue to receive the MBMS service or be able to receive the MBMB service it was interested in while located in the source cell 208a. In one example, the eNB 206a is able to select the target cell 208d (for example) when the processor 306 interfaces with the memory 308 and executes processor-executable instructions stored therein to: (a) request the UE 202 while located within the source cell 208a to provide information about the MBMS service; (b) receive the requested information from the UE 202; (c) acquire information which identifies a MBSFN Area and optionally a MBSFN Synchronization Area within each of neighboring cells 208b, 208c and 208d adjacent to the source cell 208a; and (d) select one of the neighboring cells 208d (for example) to be the target cell 208d to handover the UE 202 by using the received information from the UE 202 and the acquired information about each of the neighboring cells 208b, 208c and 208d such that the UE 202 after undergoing the handover to the target cell 202 would continue to receive the MBMS service or be able to receive the MBMB service it was interested in while located in the source cell 208a.

Referring back to FIG. 2, the exemplary LTE wireless telecommunications network 200 shows a deployment of four eNBs 206a, 206b, 206c and 206d and their corresponding four cells 208a, 208b, 208c and 208d. The UE 202 is in connected mode and connected to cell 208a (source cell 1). When a handover becomes necessary, the eNB 206a should, if possible, select a cell 208d (for example) where the UE 202 continues to receive the MBMS service it currently receives. As described in the Background Section, the traditional eNB 106a using the currently standardized 3GPP solution does not know which of the neighboring cells 108b, 108c or 108d are advantageous to select such that the UE 102 may continue receiving the MBMS service. The eNB 206a addresses this problem by requesting the UE 202 to provide information about which MBMS services it is receiving or is interested in receiving and acquiring information about the MBSFN Areas and optionally the MBMS Synchronization Areas of the neighboring cells 208b, 208c and 208d. Thereafter, the eNB 206a uses this information to select a cell 208d (for example) where the UE 202 is still able to receive or if desired could receive the MBMS Service.

The eNB 206a may acquire the information about its neighboring cells 208b, 208c and 208d in several ways (for example):

1. By Configuration

2. By exchanging the information between the eNBs 206a, 206b, 206c and 206d using an external interface such as the M2 interface, the X2 interface, and/or the S1 interface (see FIG. 2). There is an advantage when exchanging the information using the X2 interface since there will be minimum extra configuration work required when compared to using another interface since the system may to a large extent be automatically configured. Furthermore, if the MBSFN Service area and MBMS Synchronization Area are provided using the X2 Setup Request and X2 Setup Response messages as well as in the eNB configuration update message then the configuration effort in the system is kept to a minimum. These messages are described in 3GPP TS 36.423 entitled "3rd Generation Partnership Project; Technical Specification Group Radio Access Network; Evolved Universal Terrestrial Radio Access Network (E-UTRAN); X2 application protocol (X2AP) (Release 10)" V.10.2.0 dated June 2011 (the contents of which are incorporated by reference herein). Alternatively, it is also possible to define a new message which carries the information over the X2 interface.

3. Any interface connecting the eNBs 206a, 206b, 206c and 206d (see FIG. 2).

In the present example, Table 1 shows the information available in the eNB 206a (for example) about cells 208b, 208c and 208d (cells 2-4).

TABLE 1

|  | MBSFN Synchronization Area | MBSFN Area | Cell supporting same MBSFN area |
| --- | --- | --- | --- |
| Cell 208b (cell 2) | 2 | 1 | No |
| Cell 208c (cell 3) | 1 | 2 | No |
| Cell 208d (cell 4) | 1 | 1 | Yes |

Once, the eNB 206a (for example) has the information about the MBMS service used by the UE 202 and the information about its neighboring cells 208b, 208c and 208d then it may use this information to evaluate the possible target cells 208b, 208c and 208d and select the target cell 208d (for example) to handoff the UE 202 so the UE 202 may continue to receive the MBMS service or start receiving the desired MBMS service. An example of how the eNB 206a (for example) may operate is as follows:

1. The eNB 206a manages cell 208a belonging to MBMS Synchronization Area 1 and MBSFN Area 1 and provides/starts the MBMS Service identified by TMGI=1.

2. The eNB 206a asks the UE 202 or request the UE 202 which MBMS service(s) it is receiving or interested in receiving.

3. The UE 202 responds with TMGI=1 and optionally which MBSFN Area the UE 202 receives the service from.

4. The eNB 206a realizes that the service identified by TMGI=1 runs in MBSFN Area=1 and belongs MBSFN Synchronization Area=1.

5. The eNB 206a identifies neighboring cell 208d (cell 4) as the optimal candidate since it supports the MBSFN Area 1 and belongs to MBSFN Synchronization Area=1.

6. The eNB 206a knows that cell 208d (cell 4) belongs to the same MBSFN Area, the same MBSFN Synchronization Area, and that service continuity is possible so a handover to cell 208d (cell 4) is made.

If the exemplary LTE wireless telecommunications network 200 has geographically separated areas controlled by different MCEs 210a, 210b and 210c then it is possible for the eNB 206a to select cell 208d (cell 4) based on the MBSFN Area only while the MBSFN Synchronization Area is not needed because the MBSFN Area ID selected by the individual MCEs are selected in a coordinated way by the operator. However this is a less robust solution even though possible in this particular case.

In any case, the eNB 206a (for example) may want to reduce the number of times it sends a request to the UE 202 to report if it is currently receiving a MBMS service or is interested in receiving a MBMS service. There are several ways of achieving this and two exemplary options are as follows:

1. The eNB 206a (for example) may ask once and send the information about the MBMS service that UE is currently receiving or interested in to the neighboring eNB 206d (for example) which manages the target cell 208d (cell 4) at handover. The neighboring eNB 206d upon receiving the UE 202 may then decide when it shall request the information again based on configuration. This may be implemented by having the eNB 206a send a list to the neighboring eNB 206d identifying the MBMS service(s) the UE 202 has reported an interest in receiving or is currently receiving.

2. The eNB 206a after requesting the MBMS service information from the UE 202 starts a timer measuring the age of the received MBMS service information. Then, when the eNB 206a regards the received MBMS service information to be old it may request the UE 202 to provide the MBMS service information again. The eNB 206a may transfer the MBMS service information to the neighboring eNB 206d during handover by for instance using a list identifying the MBMS service(s) the UE 202 is interested in receiving and the time since the information was provided.

There may be a situation where the eNB 206a may decide to perform a handover under normal conditions (e.g., UE 202 moving out of source cell 208a) or because the radio conditions are bad in the source cell 208a but there is no target cell which is available that supports the same MBSFN Area and MBSFN Synchronization area. In addition, there may be a situation where there are no target cells which broadcast any type of MBMS service and thus the neighboring eNB which receives the handoff from the eNB 206a may not retrieve information from the handovered UE 202 to determine which MBMS services it is interested in. These two situations are not shown in FIG. 2.

In these two situations or similar situations, the eNB 206a (for example) may transfer information in the handover preparation to the neighboring eNB (e.g., neighboring eNB) which manages the target cell to notify the neighboring eNB that the UE 202 was previously receiving a MBMS Service or was interested in receiving a MBMS service. For example, the information that may be transferred to the neighboring eNB may include any of the following:

1. MBSFN Area or a list of MBSFN Areas that could be sorted according to a priority.

2. MBSFN Area(s) and an indicator indicating how long the network (or eNBs) is to propagate the received MBMS information.

3. MBSFN Area(s) and corresponding MBSFN Synchronization Area(s).

4. MBSFN Area(s), corresponding MBSFN Synchronization Area(s), and an indicator indicating how long the network (or eNBs) is to propagate the received MBMS information.

Note: The eNB 206a (for example) could also transmit this information to the neighboring eNB 206d (for example) in the situation where the eNB 206d could continue to provide the MBMS service to the UE 202.

The neighboring eNB may use this information to effectively steer the UE 202 in a subsequent handover to another eNB which manages a target cell that is capable of providing the previously received or interested MBMS service to the UE 202. If the other eNB is not able to provide the previously received or interested MBMS service to the UE 202 then it may also send the information in a handover to yet another eNB which may manage a target cell that is capable of providing the previously received or interested MBMS service to the UE 202. Thus, by using this information it is possible for the network to steer the UE 202 interested in receiving a service over MBMS back to the correct MBSFN Area after one or more handovers to cells that do not support the desired MBMS Service areas. There are several possible alternatives to this scheme in which one of the eNBs would discontinue forwarding this information during one or more handovers. For example, the eNB may use the time since the UE 202 reported that it was receiving or interested in receiving the MBMS service to decide when the information is outdated and the network will no longer take the MBSFN Area information into consideration. In another example, the eNB may use the time until the last service the UE 202 has reported interest in stops for each MBSFN Area to decide when the information is removed and the network will no longer take the MBSFN Area information into consideration.

Figure 4:
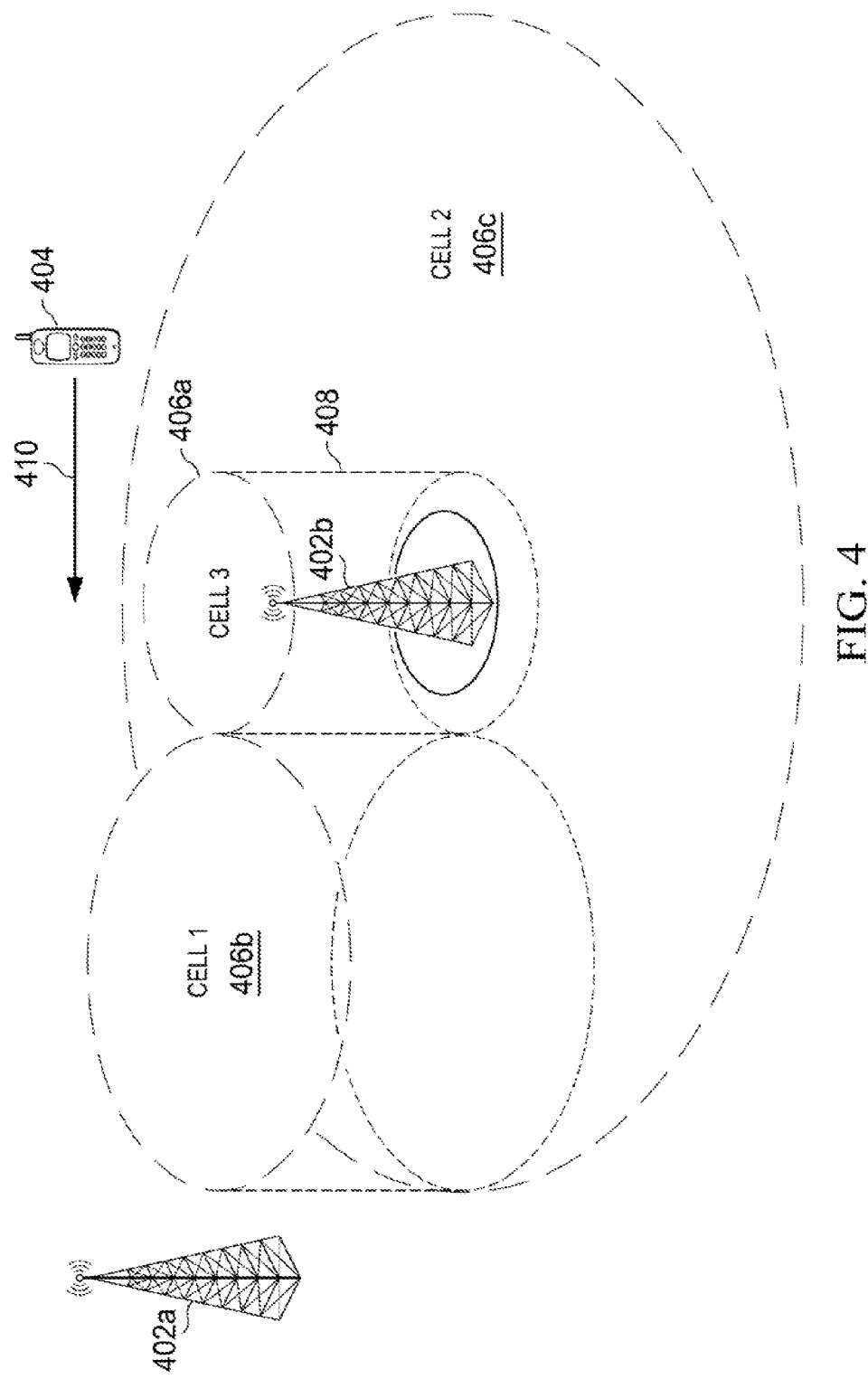
FIG. 4 is a diagram used to explain how apparatuses (eNBs) may function in a scenario where a UE which is currently receiving a MBMS service has to be handover to a cell that does not support MBMS in accordance with an embodiment of the present invention.

Referring to FIG. 4, there is a diagram used to explain how eNBs 402*a* and 402*b* could function in a scenario where a UE 404 which is currently receiving a MBMS service has to be handover to a cell 406*a* (cell 3) that does not support MBMS in accordance with an embodiment of the present invention. In this scenario, the eNB 402*a* manages two cells 406*b* and 406*c* (cells 1 and 2) where the MBMS service is provided in cell 406*c* (cell 2) but not in cell 406*b* (cell 1). Further, there is a coverage hole 408 in the radio coverage area of cell 406*c* (cell 2) and to provide radio coverage in the coverage hole 408, cell 406*a* (cell 3) is deployed which is managed by eNB 402*b*. Cells 406*a* (cell 3) and cell 406*b* (cell 1) belong to the same frequency layer while cell 406*c* (cell 2) which is currently providing the MBMS service to UE 404 belongs to another frequency layer.

As shown, the UE 404 is receiving the MBMS service and moving from the right towards the left as indicated by the arrow 410. When the UE 404 arrives to the coverage hole 408, the eNB 402*a* selects cell 406*a* (cell 3) which is managed by eNB 402*b* as the target for handover and performs the handover. The eNB 402*a* does not select cell 406*a* (cell 1) because it is not within range for the UE 404. The eNB 402*a* knows for example due to configuration or information exchange using the X2 interface which MBSFN area(s) and MBSFN Synchronization Area(s) are supported by cell 406*c* (cell 2). Thus, the eNB 402*a* knows the UE 404 upon handover may no longer be able to receive the MBMS service.

The challenge is to move the UE 404 back to cell 406*c* (cell 2) where the MBMS service is available when the radio coverage is sufficient. To meet this challenge, the eNB 402*a* provides during the handover the MBSFN Area(s) and MBSFN Synchronization Area(s) where the UE 404 is currently receiving the MBMS Service from to the eNB 402*b*. Thus, the eNB 402*b* knows that a future handover to cell 406*c* (cell 2) is preferable when compared to a handover to cell 406*b* (cell 1) taking into account MBMS provided Services.

However, depending on the radio conditions, the eNB 402*b* may need to handover the UE 404 to cell 406*b* (cell 1) anyway when the UE 202 moves further to the left. In this case, the eNB 402*b* would transfer the MBMS information about the MBMS service previously received by the UE 404 to the eNB 402*a*. The eNB 402*a* will now know that it would be advantageous to move the UE 404 to cell 406*c* (cell 2). Hence, to meet this particular challenge the eNBs 402*a* and 402*b* would continue to forward the MBSFN Area(s) and corresponding MBSFN Synchronization area(s) in which the UE 402 was receiving or interested in receiving MBMS services from during handovers.

In the event, the UE 402 remains in cell 406*a* (cell 3) for a long time, then the MBMS service it reported having received or having an interest in receiving may have stopped. To meet this challenge, the eNB 402*a* may add a time indicator in the MBMS information which is transmitted to the eNB 402*b* when transitioning the UE 404 from cell 406*a* (cell 2) to cell 406*c* (cell 3). Or, the eNB 402*b* may use a timer which is started when receiving the UE 404. Thus, when a predetermined amount of time has expired since the eNB 402*b* received the UE 404, then the eNB 402*b* knows that too much time has passed since the UE 404 was receiving the MBMS service and there is no point in trying to steer the UE 404 back to the MBSFN Area where the service was provided.

Hence, using the scenario illustrated in FIG. 4, the eNBs 402*a* and 402*b* may perform as follows:

1. Start condition: The UE 404 receives a service identified by TMGI=1 and the cell 406*c* (cell 2) belongs to MBSFN Area=1 and MBSFN Service Area=1. The eNBs 402*a* and 402*b* know by configuration or information exchange over connecting interfaces that cell 406*c* (cell 2) supports MBSFN Area=1 and MBSFN Service Area=1.
2. The UE 404 starts receiving the MBMS service while moving from the right side towards the left side as indicated by arrow 410 in the FIG. 4.
3. The UE 404 moves away from the radio coverage area provided by cell 406*c* (cell 2). To not lose radio coverage, the eNB 402*a* selects cell 406*a* (cell 3) as the target for the handover and performs the handover to eNB 402*b*. In the handover preparation procedure the MBSFN Service Area, MBSFN Synchronization Area and the time indicator is included in the message sent to the eNB 402*b*.
4. The UE 404 is in connected mode in cell 406*a* (cell 3).
    the cell 406*a* (cell 3) does not support MBSFN Area=1.
    the eNB 402*b* knows that cell 406*b* (cell 1) does not support MBSFN Area=1.
    the eNB 402*b* knows that cell 406*c* (cell 2) supports MBSFN Area=1 and MBSFN Synchronization Area=1.
5. If the time indicator indicates that it is still advantageous for the eNB 402*b* to try to steer the UE 404 back to MBSFN Area=1 and MBSFN Synchronization Area=1 it performs a handover to cell 406*c* (cell 2) when possible such as, for example, when the measurements provided by the UE 404 indicate there are sufficiently good radio conditions in cell 406*c* (cell 2).
6. After a successful handover, the UE 402 has returned to cell 406*c* (cell 2) and may receive the MBMS service provided in MBSFN Area=1.

Alternatively, using the scenario illustrated in FIG. 4, the eNBs 402*a* and 402*b* may perform as follows:

1. Start condition: The UE 404 receives a service identified by TMGI=1 and the cell 406*c* (cell 2) belongs to MBSFN Area=1 and MBSFN Service Area=1. The eNBs 402*a* and 402*b* know by configuration or information exchange over connecting interfaces that cell 406*c* (cell 2) supports MBSFN Area=1 and MBSFN Service Area=1.
2. The UE 404 starts receiving the MBMS service while moving from the right side towards the left side as indicated by arrow 410 in the FIG. 4.
3. The UE 404 moves away from the radio coverage area provided by cell 406*c* (cell 2). To not lose radio coverage, the eNB 402*a* selects cell 406*a* (cell 3) as the target for the handover and performs the handover to eNB 402*b*. In the handover preparation procedure the MBSFN Service Area, MBSFN Synchronization Area and the time indicator is included in the message sent to the eNB 402*b*.
4. The UE 404 is in connected mode in cell 406*a* (cell 3).
    the cell 406*a* (cell 3) does not support MBSFN Area=1.
    the eNB 402*b* knows that cell 406*b* (cell 1) does not support MBSFN Area=1.

the eNB 402b knows that cell 406c (cell 2) supports MBSFN Area=1 and MBSFN Synchronization Area=1.

5. If the time indicator indicates that it is still advantageous for the eNB 402b to try to steer the UE 404 back to MBSFN Area=1 and MBSFN Synchronization Area=1 but because of the radio conditions in cell 406a (cell 3) it must select cell 406b (cell 1) as the target cell and performs the handover. In the handover preparation procedure the MBSFN Service Area, MBSFN Synchronization Area and the time indicator is included in the message sent to the eNB 402a.

6. The UE 404 is in connected mode in cell 406b (cell 1).
  the cell 406b (cell 1) does not support MBSFN Area=1
  the eNB 402a knows that cell 406a (cell 3) does not support MBSFN Area=1.
  the eNB 402a knows that cell 406c (cell 2) supports MBSFN Area=1 and MBSFN Synchronization Area=1.

7. If the time indicator indicates that it is still advantageous for the eNB 402a to try to steer the UE 404 back to MBSFN Area=1 and MBSFN Synchronization Area=1 it performs a handover to cell 406c (cell 2) when possible such as, for example, when the measurements provided by the UE 404 indicate there is sufficiently good radio conditions in cell 406c (cell 2).

8. If the handover is successful, the UE 404 has returned to cell 406c (cell 2) and may receive the MBMS service provided in MBSFN Area=1.

Figure 5:
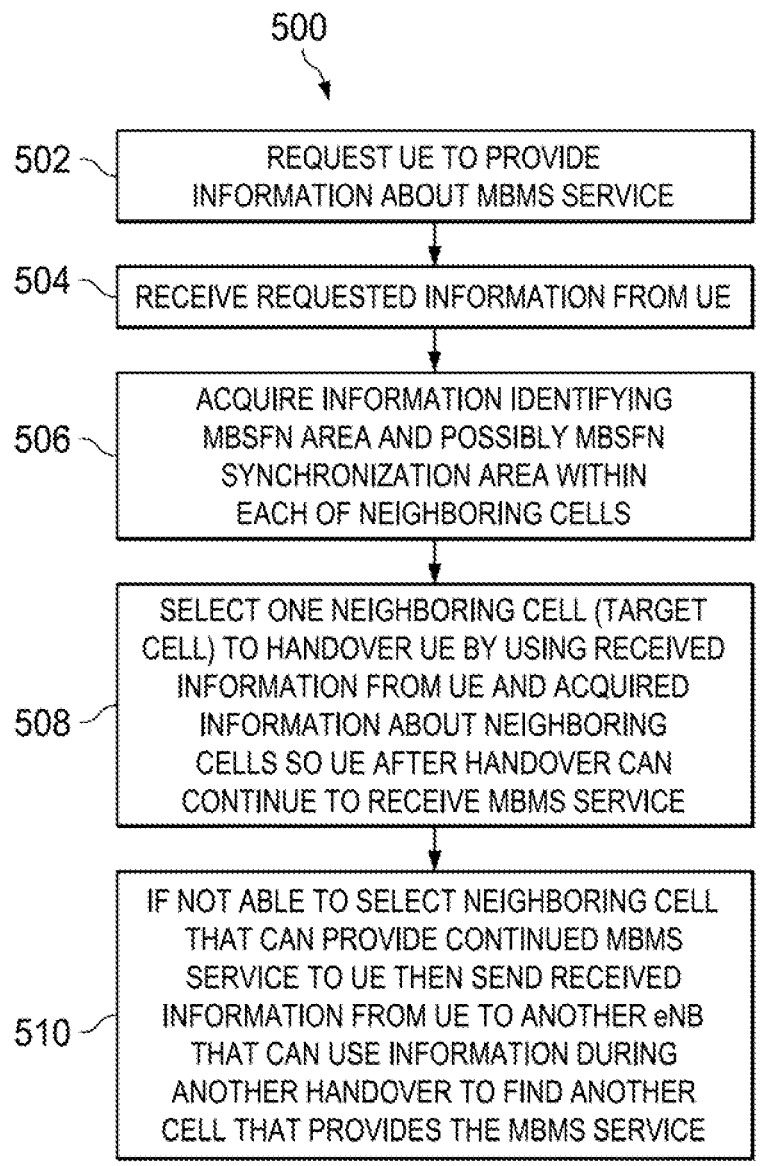
FIG. 5 is a flowchart illustrating the basic steps of a method implemented by the apparatus (e.g., eNB) for selecting a target cell to handover a UE such that the UE would continue to receive a MBMS service in accordance with an embodiment of the present invention.

Referring to FIG. 5, there is a flowchart illustrating the basic steps of an exemplary method 500 implemented by the eNB 206a (for example) for selecting a target cell 208d (for example) to handover the UE 202 (for example) such that the UE 202 would continue to receive a MBMS service or receive a MBMS service they where interested in receiving while in the source cell in accordance with an embodiment of the present invention. Beginning at step 502, the eNB 206a requests the UE 202 while located within the source cell 208a to provide information (e.g., TMGI) about the MBMS service they are currently receiving or interested in receiving. At step 504, the eNB 206a receives the requested information (e.g., TMGI) from the UE 202. At step 506, the eNB 206a acquires information which identifies a MBSFN Area and optionally a MBSFN Synchronization Area within each of neighboring cells 208b, 208c, and 208d adjacent to the source cell 208a. At step 508, the eNB 206a selects one of the neighboring cells 208d (for example) to be the target cell to handover the UE 202 by using the received information from the UE 202 and the acquired information about each of the neighboring cells 208b, 208c, and 208d such that the UE 202 after undergoing the handover to the target cell 208d would continue to receive the MBMS service. At step 510, if the eNB 206a cannot select a target cell to handover the UE 202 such that the UE 202 would continue to receive the MBMS service or be able to receive the interested MBMS service then the eNB 206a would send the received information about the MBMS service received by the UE 202 and possibly the time indicator to a neighboring eNB associated with one of the neighboring cells that was selected for the handover of the UE 202 even though the neighboring cell associated with the selected neighboring eNB does not support the MBMS service. Then, the neighboring eNB would use the received information about the MBMS service that was previously received by the UE during another handover to select another target cell where the UE 202 would be able to receive the MBMS service.

From the foregoing, it may be seen that the present invention was described above with respect to a LTE wireless telecommunications network and eNBs. However, the previously described exemplary embodiments of the present invention may be practiced in any type of wireless telecommunication network where there is an apparatus (e.g., eNB, base station) that manages a cell in which a UE may receive a MBMS service. For example, the present invention may be practiced in GSM, UMTS/W-CDMA, CDMA2000, or WiMAX wireless telecommunication networks. Furthermore, the present invention has many other features, advantages etc. . . . in addition to those mentioned above some of which are as follows:

If an indication of which MBMS service the UE is interested in receiving or is receiving is sent to the target cell this reduces the number of times an apparatus (e.g., eNB, base station) has to request a UE to report the MBMS services it is receiving or interested in receiving.

Since the apparatus (e.g., eNB, base station) knows if a UE is interested in a particular MBMS service it also knows when it is not necessary to take the MBSFN areas in the neighboring cells into consideration hence allowing different handover strategies depending on if a UE is receiving a MBMS service over MBMS broadcast or not.

When the network propagates the MBSFN Area in the handover messages the network may return the UE to a suitable cell when the network had to trigger a handover to a cell not broadcasting any MBMS Service where the alternative is even worse, such as dropping the UE.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An apparatus configured to manage a source cell with a radio coverage area within which there is currently located a user equipment, the apparatus comprising:
  a processor; and
  a memory that stores processor-executable instructions therein where the processor interfaces with the memory and executes the processor-executable instructions to enable the following:
    select a target cell to handover the user equipment such that the user equipment would continue to receive a Multimedia Broadcast Multicast Service, MBMS service by:
      requesting the user equipment while located within the source cell to provide information about the MBMS service;
      receiving the requested information from the user equipment;
      acquiring information which identifies a Multicast Broadcast Single Frequency Network, MBSFN, Area within each of neighboring cells adjacent to the source cell; and
      selecting one of the neighboring cells to be the target cell to handover the user equipment by using the received information from the user equipment and the acquired information about each of the neighboring cells such that the user equipment after undergoing the handover to the target cell would continue to receive the MBMS service; and wherein if the processor is not able to select a target cell to handover the user equipment such that the user equipment would continue to receive the MBMS service then the processor further executes the processor-executable instructions to have the received information about the MBMS service currently being received by the user equipment sent to a neighboring apparatus associated with one of the neighboring cells that was selected for the handover of the user equipment even though the selected neighboring cell associated with the neighboring apparatus does not support the MBMS service.

2. The apparatus of claim 1, wherein the processor further executes the processor-executable instructions to acquire additional information which identifies the MBSFN Area and a MBSFN Synchronization Area within each of the neighboring cells and then uses the acquired additional information to select the target cell such that the user equipment after undergoing the handover to the target cell would continue to receive the MBMS service.

3. The apparatus of claim 1, wherein the processor further executes the processor-executable instructions to select the target cell such that the user equipment after undergoing the handover is able to receive a MBMS service that the user equipment was interested in receiving but did not receive while in the source cell.

4. The apparatus of claim 1, wherein the received requested information from the user equipment includes a Temporary Mobile Group Identifier, TMGI.

5. The apparatus of claim 1, wherein the processor further executes the processor-executable instructions to acquire the information which identifies the MBSFN Area within each of neighboring cells by:
  receiving the information by operator configuration;
  receiving the information using an external interface selected from a M2 interface, a X2 interface, and a S1 interface; or
  receiving the information using an interface connecting to neighboring apparatuses that manage the neighboring cells.

6. The apparatus of claim 1, wherein the processor further executes the processor-executable instructions to request the user equipment while located in the source cell to provide information about the MBMS service by:
  requesting the user equipment to provide information about the MBMS service one time while the user equipment is located in the source cell; or
  requesting the user equipment to provide information about the MBMS service during predetermined time periods while the user equipment is located in the source cell.

7. The apparatus of claim 1, wherein the apparatus sends the information about the MBMS service currently being received by the user equipment to the neighboring apparatus associated with the selected neighboring cell to enable the neighboring apparatus to use the received information about the MBMS service that was previously received by the user equipment during another handover to select another target cell where the user equipment would be able to receive the MBMS service.

8. A method implemented by an apparatus which manages a source with a radio coverage area in which there is currently located a user equipment, the method comprising:
  selecting a target cell to handover the user equipment such that the user equipment would continue to receive a Multimedia Broadcast Multicast Service, MBMS, service, wherein the selecting step further comprises the steps of:
    requesting the user equipment while located within the source cell to provide information about the MBMS service;
    receiving the requested information from the user equipment;
    acquiring information which identifies a Multicast Broadcast Single Frequency Network, MBSFN, Area within each of neighboring cells adjacent to the source cell; and
    selecting one of the neighboring cells to be the target cell to handover the user equipment by using the received information from the user equipment and the acquired information about each of the neighboring cells such that the user equipment after undergoing the handover to the target cell would continue to receive the MBMS service; and
  wherein if a target cell cannot be selected to handover the user equipment such that the user equipment would continue to receive the MBMS service then sending the received information about the MBMS service currently being received by the user equipment to a neighboring apparatus associated with one of the neighboring cells that was selected for the handover of the user equipment even though the selected neighboring cell associated with the neighboring apparatus does not support the MBMS service.

9. The method of claim 8, wherein the acquiring step further comprises acquiring additional information which identifies the MBSFN Area and a MBSFN Synchronization Area within each of the neighboring cells such that the acquired additional information is then used when selecting the target cell such that the user equipment after undergoing the handover to the target cell would continue to receive the MBMS service.

10. The method of claim 8, wherein the selecting step further comprises selecting the target cell such that the user equipment after undergoing the handover is able to receive a MBMS service that the user equipment was interested in receiving but did not receive while in the source cell.

11. The method of claim 8, wherein the received requested information from the user equipment includes a Temporary Mobile Group Identifier, TMGI.

12. The method of claim 8, wherein the acquiring step further comprises one of the following:
  receiving the information by operator configuration;
  receiving the information using an external interface selected from a M2 interface, a X2 interface, and a S1 interface; or
  receiving the information using an interface connecting to neighboring apparatuses that manage the neighboring cells.

13. The method of claim 8, wherein the requesting step further comprises one of the following:
  requesting the user equipment to provide information about the MBMS service one time while the user equipment is located in the source cell; or
  requesting the user equipment to provide information about the MBMS service during predetermined time periods while the user equipment is located in the source cell.

14. The method of claim 8, wherein the apparatus sends the information about the MBMS service currently being received by the user equipment to the neighboring apparatus associated with the selected neighboring cell to enable the neighboring apparatus to use the received information about the MBMS service that was previously received by the user equipment during another handover to select another target cell where the user equipment would be able to receive the MBMS service.

15. A wireless telecommunication system comprising:
an apparatus configured to manage a source cell with a radio coverage area within which there is currently located a user equipment;
at least one neighboring apparatus, each neighboring apparatus configured to manage a neighboring cell which is adjacent to the source cell;
the apparatus comprising:
a processor; and
a memory that stores processor-executable instructions therein where the processor interfaces with the memory and executes the processor-executable instructions to enable the following:
select a target cell to handover the user equipment such that the user equipment would continue to receive a Multimedia Broadcast Multicast Service (MBMS) service by:
requesting the user equipment while located within the source cell to provide information about the MBMS service;
receiving the requested information from the user equipment;
acquiring information which identifies a Multicast Broadcast Single Frequency Network (MBSFN) Area within each of neighboring cells adjacent to the source cell; and
selecting one of the neighboring cells to be the target cell to handover the user equipment by using the received information from the user equipment and the acquired information about each of the neighboring cells such that the user equipment after undergoing the handover to the target cell would continue to receive the MBMS service; and
wherein if the apparatus is not able to select a target cell to handover the user equipment such that the user equipment would continue to receive the MBMS service then the apparatus sends the received information about the MBMS service currently being received by the user equipment to the neighboring apparatus that was selected for the handover of the user equipment even though the neighboring cell associated with the selected neighboring apparatus does not support the MBMS service then the selected neighboring apparatus would use the received information about the MBMS service that was previously received by the user equipment during another handover to select another target cell where the user equipment would be able to receive the MBMS service.

16. The wireless telecommunication system of claim 15, wherein if the selected neighboring apparatus is not able to select a target cell to handover the user equipment such that the user equipment would be able to receive the MBMS service then the selected neighboring apparatus sends the received information about the MBMS service that was previously received by the user equipment to another apparatus that was selected for the handover of the user equipment even though a cell associated with the selected another apparatus does not support the MBMS service so the selected another apparatus would use the received information about the MBMS service that was previously received by the user equipment during yet another handover to select yet another target cell where the user equipment would be able to receive the MBMS service.

17. The wireless telecommunication system of claim 15, wherein the apparatus would also send information about a MBMS service that the user equipment was interested in receiving but did not receive while in the source cell to the selected neighboring apparatus which would use the information about the MBMS service that the user equipment was interested in receiving but did not receive while in the source cell during another handover to select another target cell where the user equipment would be able to receive the MBMS service.

18. The wireless telecommunication system of claim 15, wherein the received information about the MBMS service currently being received by the user equipment that is sent to the neighboring apparatus would include one of the following:
at least a MBSFN Area;
at least a MBSFN Area and an indicator indicating how long the received information is to be propagated;
at least a MBSFN Area and a MBSFN Synchronization Area; or
at least a MBSFN Area, a MBSFN Synchronization Area, and an indicator indicating how long the received information is to be propagated.

* * * * *

UNITED STATES PATENT AND TRADEMARK OFFICE
CERTIFICATE OF CORRECTION

PATENT NO. : 8,625,606 B2  
APPLICATION NO. : 13/217542  
DATED : January 7, 2014  
INVENTOR(S) : Drevo Page 1 of 1

It is certified that error appears in the above-identified patent and that said Letters Patent is hereby corrected as shown below:

On the Title Page, in Item (56), under "OTHER PUBLICATIONS", in Column 2, Line 10, delete "applicaton" and insert -- application --, therefor.

On the Title Page, in Item (57), under "ABSTRACT", in Column 2, Line 6, delete "they where" and insert -- they were --, therefor.

In the Specification:

In Column 2, Line 47, delete "eNB 104a" and insert -- eNB 106a --, therefor.

In Column 2, Line 50, delete "eNB 104a" and insert -- eNB 106a --, therefor.

In Column 6, Line 25, delete "target cell 202" and insert -- target cell 208d --, therefor.

In Column 11, Line 36, delete "they where" and insert -- they were --, therefor.

Signed and Sealed this  
Fifteenth Day of July, 2014

Michelle K. Lee  
*Deputy Director of the United States Patent and Trademark Office*